July 6, 1937.   A. DVORNIK   2,086,182
METHOD OF AND APPARATUS FOR PRODUCING CINEMATOGRAPHIC PICTURES
Filed Feb. 13, 1933   2 Sheets-Sheet 2
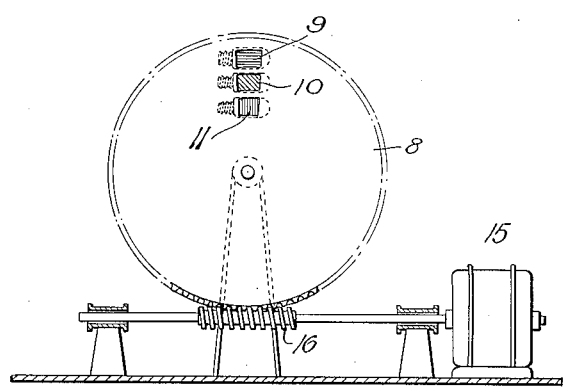
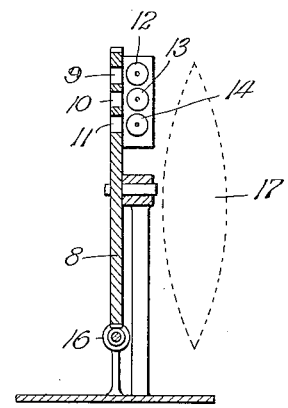
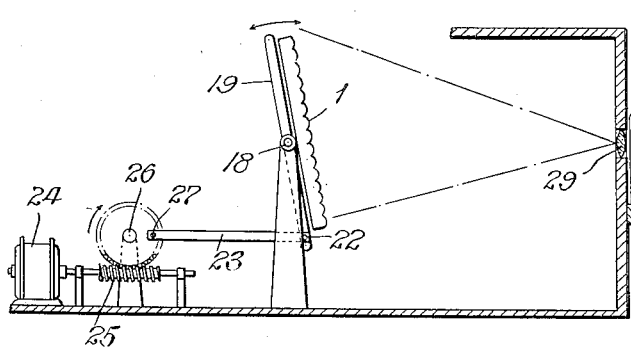
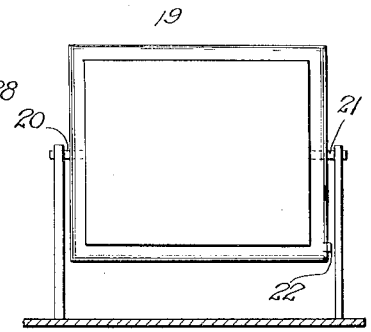
Inventor.
Andrija Dvornik,
By Ferd. Ursch Patented July 6, 1937

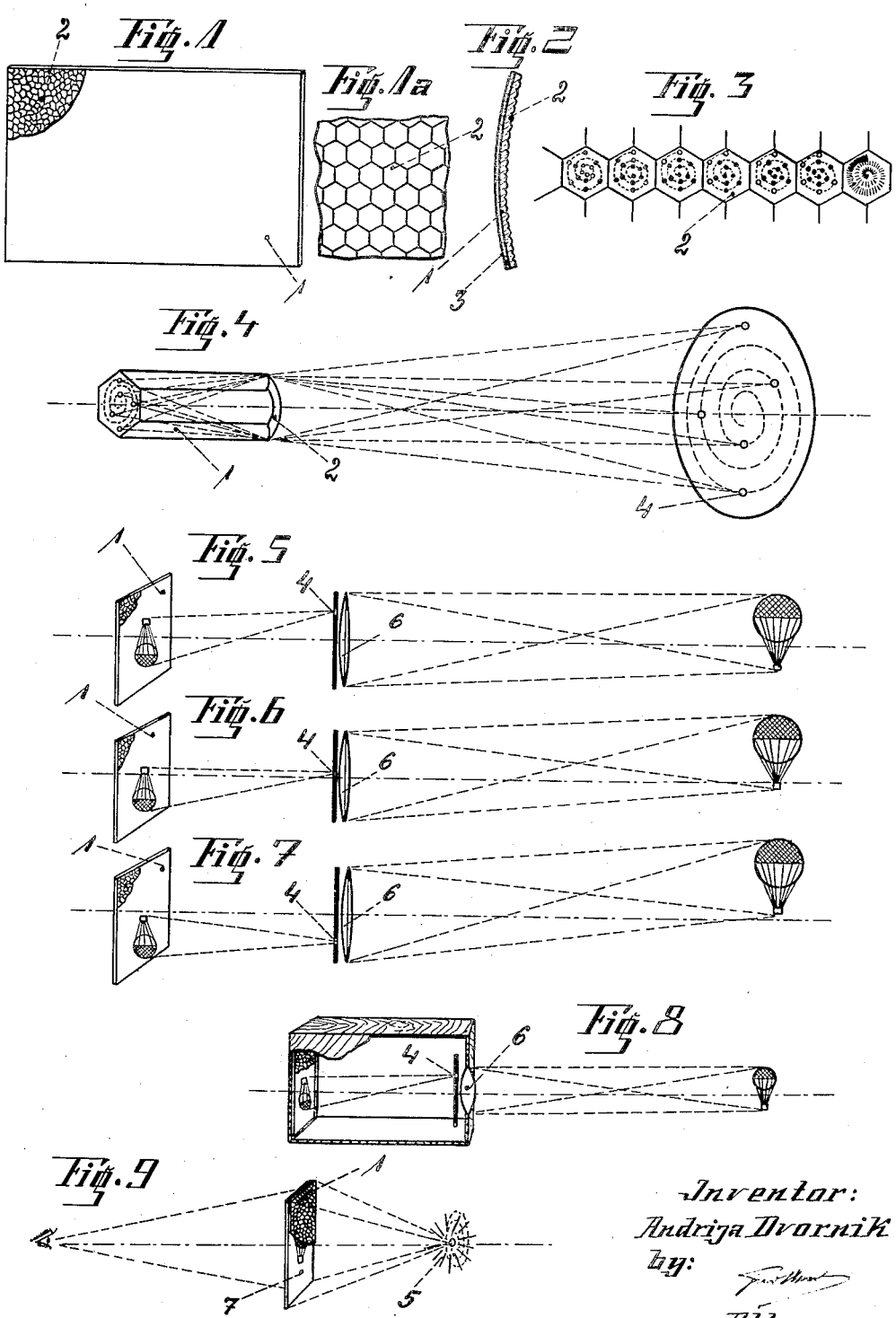

2,086,182

UNITED STATES PATENT OFFICE 2,086,182

METHOD OF AND APPARATUS FOR PRODUCING CINEMATOGRAPHIC PICTURES

Andrija Dvornik, Zagreb, Yugoslavia

Application February 13, 1933, Serial No. 656,535
In Germany October 12, 1932,

8 Claims. (Cl. 88—16.4)

The present invention relates to a method and apparatus for taking and exhibiting cinematographic pictures by means of lens-screen plates or lens-screen films. The screen-lenses according to the invention are always substantially circular ones, i. e. lenses having punctiform foci. The present invention is based on the fact that an image projected by a photographic camera lens on such a lens-screen is dissected by the action of the screen-lenses into a large number of relatively very small image points separated by distances corresponding to the spacing or pitch of the lenses. These image points are nothing more or less than reproductions of the camera-lens aperture, i. e. the scanning aperture formed once by each screen lens on the photographic layer mounted directly on the lens-screen in the focal plane of the screen-lenses. The present method consists in imparting a relative movement between one or more scanning apertures on the one hand and an emulsified lens plate or film on the other, the lens plate consisting of a large number of circular lens elements having punctiform foci, and the relative movement being such that the image of the scanning aperture or apertures projected on the photosensitive layer by each screen plate is progressively displaced in the field of such lenticular screen plate. For the purpose of exhibiting such pictures, the scanning aperture or apertures is or are replaced by an illuminating source or sources, such as an incandescent lamp or the like. The relative movements between the source of light on the one hand and the developed, and, may be, copied lenticular screen plate or film on the other are then repeated identically with the relative movements of corresponding parts in taking the picture. The moving picture can then be made visible e. g. on a focussing screen which is mounted behind the lenticular screen plate closely at the emulsion side thereof.

The aim of the present invention is to overcome certain drawbacks, especially to make the cinematographic images visible for a large number of spectators simultaneously, to simplify the means for taking of cinema images directly from the nature, so that a single lenticular screen plate only is necessary this plate being, in the simplest embodiment of the present invention, during the exhibition perfectly immovable, no means being necessary between the light source or the exposing aperture and the lenticular-screen plate, the light rays having thus an entirely free path.

A further fundamental feature of novelty constituting the present invention consists in the method of copying and manifolding such lens-screen images as hereinafter described.

In order to provide room behind each screen lenticular element for a possibly large number of image points belonging to images successive in time, for instance for 500 image points, the reproductions of the camera lens aperture, that is of the exposing aperture, must therefore be as minute as possible. Therefore, I make use either of an extremely small-rapid objective, or of an extremely rapid objective in connection with a relatively small hole in a diaphragm, this hole being hereinafter called the "exposing aperture". The exposing aperture is arranged either in front of the objective or behind the same or between the lenses thereof, and it is, for instance, movable in such a continual and progressive manner, that it is able to move past all points of the objective aperture, that is to say, can scan this aperture. It is obvious that such diaphragm has nothing in common with the diaphragm of the cinematographic or photographic apparatuses to-day in use, and in order to prevent confusion I prefer the term "scanning aperture".

If now, for the taking purpose, the scanning aperture is moved in the aperture of the extremely rapid objective lens and the lenticular screen plate remains fixed, the path of the scanning aperture will be photographed behind every lenticular screen plate, as a line, on a very reduced scale. Said line registers temporarily only successive fluctuations in the intensity of the illumination of the lenticular screen plate concerned, which have occurred during the taking of the picture, and may therefore be called a "time photogram".

The principles of the exhibition procedure according to my present method are practically the same as those used in the taking process. The exhibiting (reproduction) apparatus is a suitably modified, geometrically as well as optically correct copy of the taking apparatus. The optical exposing aggregate of the taking apparatus, comprising the objective and the scanning aperture, is replaced partly or wholly by a suitable source of light, the purpose of which is to emit the requisite geometrically definite flux (flow) of light rays towards the lenticular screen plate, and to illuminate the developed and, may be, copied image coating lying behind the screen, in a manner analogous to that in the taking process. It is, therefore, requisite that the relative movements having taken place during the exposure are accurately repeated between the emulsified lenticular screen plate on the one hand and the source of light on the other. In this manner the photographic impressions registered in the photosensitive layer can be projected upon a focussing screen of frosted glass, opalescent glass or the like, placed close to the emulsion side of the lenticular screen plate, whereon the moving picture is then reconstructed. The term "source of light" is meant here in quite a general sense, and a scanning aperture intensively illuminated from the outside can also serve as an excellent "source of light".

From the principle of the exhibition, as explained, can also be seen that a taking apparatus can very well be employed as an exhibiting apparatus, if for this purpose the optical exposing aggregate comprising the objective and scanning aperture, is illuminated powerfully from the outside, and the rear wall of the casing of the apparatus is removable to allow of applying a focussing screen close to the emulsion side of the lenticular screen plate.

In the before explained exhibiting process of my invention the rays of light coming from the light source fall thus first upon the lenticular screen plate and pass then throughout the same to the emulsion layer. This exhibiting method may be called the "direct".

Instead of the "direct" path of rays, the reversed or "retrograde" path in exhibiting the pictures may also be used in connection with my present invention. This "retrograde" projection is especially used for the purpose of optical copying or manifolding screen-cinematographic images, whereby a very considerable reduction of the copying time is obtained. This copying process is characterized in that all the photographic impressions produced on a master lens screen plate in a progressive manner in taking the picture, are transferred simultaneously by retrograde projection on to a similarly designed copying lenticular screen plate by means of a brief, e. g. instantaneous exposure, i. e. illuminating the entire surface of the photosensitive layer all at once.

From what has been disclosed in the preceding paragraphs it appears clearly that for carrying out this method, lens screens must be used the lenses of which are extraordinarily accurately shaped, because the quantity of different light impressions which can be registered in the photosensitive layer behind every lenticular plate, i. e. the duration of a cinematographic performance with a lenticular screen plate, depends solely upon the dissecting capacity of every screen lens.

Besides the conditions just stated, another condition is that the lenticular screen plate must be shape-proof in order to be suited for a perfect reproduction during a large number of years. Glass is absolutely shape-proof, celluloid, however, is not. It is therefore also possible to cement celluloid upon glass, for instance to cement on to a plane glass plate a lens-lenticular screen of celluloid, or a glass plate may be arranged between two celluloid plates and cemented together with them. Also other combinations with another material are possible.

Instead of only one exposing aperture in the taking process, two or more exposing apertures may be provided and used simultaneously, for instance three exposing apertures with three colored filters (red, green and blue) arranged in front of them for the purpose of producing cinematographic images in natural colors. These filters will produce behind every lenticular screen plate during the taking three different separate traces, i. e. three "time photograms" or rows of image points. For the exhibition of such color takings three externally illuminated filters or three sources of colored light (red, green and blue) will be employed, analogous to the black-and-white method.

It is a matter of course that also only one scanning aperture can be used for making an exposure with said three colored filters. The filters may be located immovably in the objective aperture and the shape of the scanning aperture may be such that, while it is being moved, it scans at the same time proportional portions of all filters.

For cinematographic color exposures it is also possible to provide a color screen containing filters in the fundamental colors (red, green and blue) anywhere between the photosensitive layer and the optical exposing aggregate, either within the camera or within the lens lenticular itself. A special modification of this arrangement would be the employment of the known starch-granule color-screen layer with red, green and blue granules between the photosensitive layer and the lens lenticular plate.

Two scanning apertures moved continually in the same direction and with the same speed, in combination with two objectives, may be used for stereoscopic cinematographic takings. The stereoscopic effect can, of course, be combined with the color-effect.

Particular effects can, furthermore, be obtained in such a manner, that during the exhibition the source of light replacing the scanning aperture is moved either at another speed or along another path or in another direction to that of the scanning aperture during the taking of the same picture.

Means for carrying out the present method are illustrated diagrammatically and by way of example on the accompanying drawings, in which Fig. 1 is a front-view of a lenticular screen plate designed according to this invention. Figure 1a is a minute portion of said plate, on a considerably enlarged scale relatively to Fig. 1. Figure 2 is a transverse section through the said lenticular screen plate. Figure 3 is a diagrammatic representation of a portion of the exposed and developed coating forming a part of the lenticular screen plate. The image point series behind every lenticular screen plate are visible. Figure 4 is a perspective diagrammatic representation of a lenticular screen plate in front of which a movable disc having scanning apertures is placed. The dash lines represent the light rays coming from the scanning apertures and forming image points in the photosensitive layer behind the screen-plate. Figures 5, 6 and 7 are diagrammatic representations of the essential elements of an apparatus for taking, i. e. exposing cinematographic pictures. These Figures (5, 6, 7) are moreover representations of three consecutive phases of an exposure made with a taking apparatus according to my invention. Figure 8 is a perspective illustration of this exposing apparatus, one of the side-walls being removed in order to show the interior thereof. And Fig. 9 is a diagrammatic representation of the essential elements of an exhibiting (reproduction) apparatus also designed according to this invention.

Fig. 10 shows a rotatable metal plate which has three apertures with filter in the fundamental colors red, green and blue.

Fig. 11 shows the same device as Fig. 10 viewed from the left, the metal disc being shown in cross section.

Fig. 12 shows a device by means of which the lenticular screen plate is oscillatably suspended on the horizontal axle so that it can swing to and fro.

Fig. 13 shows the frame alone viewed from the left.

Referring to Figs. 1, 1a and 2, 1 denotes a lenticular screen plate, 2 are the screen lenticular elements which have hexagonal apertures in this case and 3 is the photosensitive layer. In the constructional form shown in Fig. 2 the plate 1 with its lenses 2 on the one surface and the emulsion layer 3 on the opposite surface is vaulted, the screen-lenses being located on the concave surface of the lenticular screen plate. The hexagons shown in Fig. 3 are merely imaginary; they are intended to indicate that to each of the hexagonal lenses 2 pertains a coating portion of the same shape. In this figure is also shown how the image point series in the photosensitive layer arise. There are shown only a few image points, and practically 100, 1000 and more points will be registered behind each screen plate. Moreover, the image-point series arise practically in most cases during a continuous movement of the scanning aperture and therefore the image points melt or flow into each other (as diagrammatically indicated in the hexagon at the right hand end of the row of hexagons in the Fig. 3).

Referring to Fig. 4, 2 is a single lenticular screen plate like those shown in Fig. 1a and drawn to a greatly enlarged scale, and 4 denotes the scanning aperture. The movement of the scanning aperture 4, i. e. the consecutive positions of the scanning aperture are then photographed in the photo-sensitive layer placed on the rear side of the lenticular sceen plate, as is indicated there by the five black spots.

As shown on the right-hand portion of Fig. 4 the so-called "scanning device", in its simplest form, is a simple disc, e. g. of metal or other materials, having one or more holes, i. e. scanning apertures and being in connection with mechanical means for the purpose of revolving this disc.

In Fig. 5 is shown how an ascending balloon is cinematographically taken. The figure shows at its left-hand end the lenticular screen plate 1 with an image of the ascending balloon projected thereon by means of the objective 6. The ascending balloon itself is illustrated on the right hand end of Fig. 5. Behind the camera objective 6 is located the revolving disc with its scanning aperture 4. The rays of light arriving from the object space strike upon the entire area of the objective 6. The scanning aperture 4 may be so moved that it progressively scans and moves past all points of the objective area, describing a spiral, one or more circles, or any other curved lines. The scanning aperture, in every position, permits only one pencil of rays narrowly bounded by itself to pass from the objective to the lenticular screen plate 1. Owing to this manner of operation, the image of the balloon exposes, at a given position of the scanning aperture 4, only a minute portion of the photosensitive layer, being the image dissolved in as many image points, as there are lenticular screen plates in the area of the image window.

In Fig. 6 the balloon has further risen and the position of the scanning aperture 4 is different from that in Fig. 5. Therefore, in the photosensitive layer is now photographed another series of image points, corresponding to the new position of the scanning aperture 4 respectively the new position of the ascending balloon. Fig. 7 shows a continuation of the exposing procedure. The balloon has again further risen, the scanning aperture is again in another position, and the light-rays impinge, therefore, again upon another portion of the photosensitive layer forming another image point serie, and so on. If the lenticular screen plates have a good dissecting capacity and if the scanning aperture 4 is small enough, then the image points will be of a microscopical size and behind each screen lenticular element there can be 100, 1000 or more image points, on the whole area of a single lenticular screen plate an image-serie belonging to a cinematographic performance of a sufficient duration, e. g. of several minutes can be photographed.

In the Fig. 8 the members 1, 4 and 6 of Figs. 5, 6 and 7 are shown in connection with a complete taking apparatus, or camera. The only movable member of the same is the "scanning mechanism", in this example a simplified scanning mechanism consisting of a revolving disc with a scanning aperture 4. It is obvious, that the scanning aperture may be of any convenient shape, e. g. round, angular, polygonal, slit-shaped, etc. The lenticular screen plate 1 is and remains completely immovable during the taking of the picture, as well as during the exhibition of the picture.

In the diagrammatic illustration of the essential elements of an exhibiting apparatus in Fig. 9 the geometrical dependency of both the taking camera and the exhibiting apparatus is indicated by dotted lines. In relation to the lenticular screen plate 1, the source of light 5 is moved to just the same distance from the lenticular screen plate 1 and on exactly the same path as the scanning aperture was moved while the same picture had been taken. In consequence thereof the rays of light pass through the lenticular screen plate to the emulsion layer temporarily and spatially exactly as during the exposure. The means for moving the source of light in the requisite manner can be similar to the means for moving the scanning aperture in the camera. For instance, the simplest embodiment of such means is a rotary movement of the source of light, as the complement to the before-mentioned revolving disc of the camera. So, the image point series are irradiated and projected upon a focusing screen 7 where they are reconstructed to constitute a mosaic-like cinematographic picture, which is visible from all directions and for a large number of spectators simultaneously and perfectly correctly. Instead of the focusing screen, an opalescent glass, a frosted celluloid plate, etc. can be used. The size of the projected image corresponds to the size of the lenticular screen plate 1 or to the size of the image window in the camera. It is a matter of course that the movable source of light 5 is covered by the walls of the exhibition apparatus and, thus, rendered invisible for the spectators. In Fig. 9 the walls are omitted for the sake of clearness. It is moreover clear, that the apparatuses must be provided with devices giving to the lenticular screen plate a definite and invariable position during the taking or the exhibition.

The scanning mechanism in the camera may also be arranged at the outside thereof, i. e. at the front of the objective or between the lenses of the objective if this has separated lenses.

It is clear, that in this example the relative apertures of the screen lenticular elements on the one hand and of the camera objective or its aperture on the other depend upon one another, as in the photosensitive layer the adjacent images of the curved path of the scanning aperture must not overlap one another. It is, of course, desirable, that these images lie as near as possible to one another, which is attained by proper selection of the relative apertures concerned.

Whether in the camera the scanning aperture is arranged in front of, or behind the objective, or between the lenses of the same, in either case the exhibiting apparatus does not need an objective or any projection lens.

Fig. 10 shows the rotatable metal plate 8, which has three apertures with filters in the fundamental colors red, green and blue. These apertures, designated by 9, 10, 11, have behind the filters three electric incandescent lamps 12, 13, 14 which are detachable. Without the lamps the device is adapted to be used for the taking camera, in which case a large objective 17 is placed at the side of the metal plate 8, the aperture-plane of this objective being scanned by means of the three apertures 9, 10 and 11. With the lamps the device can be used for exhibiting images. The metal plate 8 is circular and has teeth in its edge so that it can be slowly rotated by the aid of an electric motor 15 and of a worm 16.

The device shown in Fig. 12 is designed to suspend the lenticular screen plate 1 on the horizontal axle so that it can swing to and fro. The lenticular screen plate is fixed in a frame 19, which hangs on shafts 20 and 21. On the lower portion of the frame at one side a pin 22 is fixed with which a rod 23 is hingedly connected. An electric motor 24 rotates by means of a worm 25 a wheel 26 in the direction of the arrow. This wheel 26 moves to and fro the rod 23 by means of a pin 27 so that the frame 19 and with the same the lenticular screen plate are continually moved slowly to and fro. An additional slow to and fro movement in the horizontal plane may also be imparted to the frame 19 so that the recording of every screen line is made in two dimensions.

Fig. 13 shows the frame alone which serves either for exposing, in which case the electric bulb 28 is removed, or for exhibiting, in which case the lens 29 is removed. For the exhibition the lamp may be moved along paths resulting from the movements during the production of the cinematographic images, the lenticular screen plate remaining at rest.

I claim:

1. A method of producing cinematographic images, which comprises collecting light of a scene with an objective, scanning the objective in its aperture plane with a small aperture, photographically producing point images of the scanning aperture of a number and spacing to provide successive point images of the scene, moving a light source in the same relation to the image points as the scanning aperture was moved while producing the images, and directing light from the moving source to illuminate the individual corresponding image points.

2. A method of producing cinematographic pictures produced as specified in claim 1, in which the relative movements of the light source and of the scanning aperture are different from the actual movements of the corresponding parts which produce the images, but the relative movements of corresponding parts are identical both when producing cinematographic images and when photographically producing point images.

3. A method as specified in claim 1, in which oscillating movements in continually changing directions are imparted to the lens plate, whereas the scanning aperture remains immovable and for photographically producing point images imparting a resultant movement to the light source, the lens plate remaining immovable.

4. A method of producing cinematographic pictures in natural colors, which comprises collecting light of a scene with an objective, scanning the objective in its aperture plane with three small apertures having each a color filter of one of the three fundamental colors: red, green and blue, photographically producing point images of the scanning apertures of a number and spacing to provide three rows of successive point images of the scene colored in accordance with the colors of the filters of the corresponding scanning apertures, replacing three differently colored light sources for said three scanning apertures, and moving the light sources in the same relation to the image points as the scanning apertures were moved while producing the images, and directing light from the moving sources to illuminate the individual corresponding image points.

5. Camera apparatus for taking lens screen cinematographic pictures comprising an objective, a movable plate having a small scanning aperture, said plate being placed in the aperture plane of the objective, a lenticular screen plate for producing point images of the scanning aperture, said plate being placed in an image plane of the objective, means to support a light sensitive emulsion in the focal plane of the screen plate, and means to move the movable plate and aperture over the objective.

6. Camera apparatus for taking lens screen cinematographic pictures in natural colors, comprising an objective, a movable plate having three small scanning apertures, a filter in each of said apertures each filter being in another of the three fundamental colors red, green and blue, said plate being placed in the aperture plane of the objective, a lenticular screen plate for producing point images of the scanning apertures, said plate being placed in an image plane of the objective, means to support a light sensitive emulsion in the focal plane of the screen plate, and means to move the movable plate and apertures over the objective.

7. Camera apparatus for exhibiting lens screen cinematographic pictures provided in a camera apparatus for taking lens-screen cinematographic pictures as specified in claim 5, comprising a movable light source opposite the stationary lenticular screen plate which has been exposed, a focussing screen behind the emulsion side of the lenticular screen plate, and means for imparting to the light source the same relative movements to said lenticular screen plate as have been imparted to the movable plate in the picture taking camera relative to said lenticular screen plate.

8. Camera apparatus for exhibiting lens screen colored cinematographic pictures provided in a camera apparatus for taking lens-screen cinematographic pictures as specified in claim 5, comprising three movable sources of light colored in similar colors as the colored point images taken in the camera as specified in claim 6 opposite the stationary lenticular screen plate which has been exposed, a focussing screen behind the emulsion side of the lenticular screen plate, and means for imparting to the three light sources the same relative movements to said lenticular screen plate as have been imparted to the movable plate in the picture taking camera relative to said lenticular screen plate.

ANDRIJA DVORNIK.